US005612414A

United States Patent [19]
Becker et al.

[11] Patent Number: 5,612,414
[45] Date of Patent: Mar. 18, 1997

[54] ORGANIC/INORGANIC POLYMERS

[75] Inventors: Kurt J. Becker, Newark; James A. Jensen, Hockessin; Alexander Lukacs, III, Wilmington, all of Del.

[73] Assignee: Lanxide Technology Company, LP, Newark, Del.

[21] Appl. No.: 614,293

[22] Filed: Mar. 12, 1996

Related U.S. Application Data

[63] Continuation of Ser. No. 148,044, Nov. 5, 1993, abandoned.

[51] Int. Cl.$^6$ ...................................................... C08F 8/42
[52] U.S. Cl. .................. 525/102; 525/327.3; 525/328.2; 525/329.4; 525/330.5; 525/337; 525/342; 525/370; 525/371; 525/420; 525/431; 525/437; 525/446; 525/452; 525/474; 525/476
[58] Field of Search .................. 525/102, 327.3, 525/328.2, 329.4, 330.5, 337, 342, 370, 371, 420, 431, 437, 446, 452, 474, 476

[56] References Cited

U.S. PATENT DOCUMENTS

| | | | |
|---|---|---|---|
| 2,623,033 | 12/1952 | Snyder | 260/75 |
| 2,892,747 | 6/1959 | Dye | 154/43 |
| 3,239,489 | 3/1966 | Fink | 260/77.5 |
| 3,288,726 | 11/1966 | Wagner | 260/2 |
| 3,320,184 | 5/1967 | Fink | 260/2 |
| 3,446,774 | 5/1969 | Kotzsch et al. | 260/47 |
| 3,505,246 | 4/1970 | Ehrlich et al. | 260/2 |
| 3,853,567 | 12/1974 | Verbeek | 106/44 |
| 4,448,939 | 5/1984 | Fasolka et al. | 525/474 |
| 4,482,669 | 11/1984 | Seyferth et al. | 524/442 |
| 4,581,468 | 4/1986 | Paciorek et al. | 556/403 |
| 4,590,005 | 5/1986 | Shanzer et al. | 260/239.3 |
| 4,612,383 | 9/1986 | Laine et al. | 556/412 |
| 4,675,424 | 6/1987 | King, III et al. | 556/412 |
| 4,687,657 | 8/1987 | Clark et al. | 423/412 |
| 4,689,252 | 8/1987 | Lebrun et al. | 427/228 |
| 4,696,968 | 9/1987 | Tebbe | 524/610 |
| 4,707,556 | 11/1987 | Paciorek et al. | 556/403 |
| 4,722,988 | 2/1988 | Porte et al. | 528/28 |
| 4,764,489 | 8/1988 | Bolt | 501/96 |
| 4,774,312 | 9/1988 | Burns | 528/33 |
| 4,929,704 | 5/1990 | Schwark | 528/28 |
| 5,001,090 | 3/1991 | Schwark | 501/97 |
| 5,021,533 | 6/1991 | Schwark | 528/21 |
| 5,032,649 | 7/1991 | Schwark | 525/474 |
| 5,155,181 | 10/1992 | Schwark | 525/474 |
| 5,164,344 | 11/1992 | Zank | 501/90 |
| 5,229,468 | 7/1993 | Jensen | 525/389 |
| 5,276,105 | 1/1994 | Jensen | 525/389 |

FOREIGN PATENT DOCUMENTS

| | | |
|---|---|---|
| 379815 | 8/1990 | European Pat. Off. . |
| 0379815 | 8/1990 | European Pat. Off. . |
| 379819 | 8/1990 | European Pat. Off. . |
| 0430080 | 6/1991 | European Pat. Off. . |
| 0442013 | 8/1991 | European Pat. Off. . |
| 453350 | 10/1991 | European Pat. Off. . |
| 0468066 | 1/1992 | European Pat. Off. . |
| 0480225 | 4/1992 | European Pat. Off. . |
| 544959 | 6/1993 | European Pat. Off. . |
| 1229290 | 11/1966 | Germany . |
| 3231931 | 3/1987 | Japan . |

OTHER PUBLICATIONS

Hawleys Condensed Chemical Dictionary, 11th ed. Sex et al. Van Nostrand Reinhold, 1987, p. 1039.
J. M. Schwark, "*Isocyanate–Modified Polysilazane Ceramic Precursors*", from Polymer Preprints, 1991, 32(3), 567–8.
E. Muller and O. Bayer, "*Methoden der Organischen Chemie*", Georg Thieme Verlag Stuttgart, New York, 1980, Band XIII/5.
J. F. Klebe, J. B. Bush, Jr. and J. E. Lyons, "*The Addition of Silylamines and Silazanes to Isocyanates*", Contribution from the General Electric Research Laboratory, Schenectady, New York, 1964.
W. Fink, "*Zur Reaktion von Isocyanat mit der Si–N–Bindung*", Nov. 13, 1963.
W. Fink, "*Zur Reaktion von Isocyanat mit cyclischen Silazanen*", Jun. 5, 1963.
J. Schwark and M. J. Sullivan, "*Isocyanate–Modified Polysilazanes: Conversion to Ceramic Materials*", Materials Research Society Symposium, Proc. vol. 271, 1992.
"*Inverse Organic–Inorganic Composite Materials, 2. Free–Radical Routes into Nonshrinking Sol–Gel Composites*", Macromolecules, 1991, 24, 5481–5483.
A. Zhdanov, G. Kotrelev, V. Levin, N. Tebeneva, V. Kotrelev, V. Martirosov and S. Obolonkova, "*Polycarbonate Silazasiloxanes*" 1981, Vysokomol. soyed. A23: No. 11, 2478–2485.
R. T. Paine and C. K. Narula, "*Synthetic Routes to Boron Nitride*", American Chemical Society, 1990, 90, 73–91.
R. H. Cragg, M. F. Lappert and B. P. Tilley, "*Chloroboration and Allied Reactions of Unsaturated Compounds. Part III. Aminoboration and Alkoxyboration of Isocyanates and Isothiocyanates*", 1963.
H. Beyer, J. Dawson, H. Jenne and K. Niedenzu, "*Boron–Nitrogen Compounds. Part XI. The Reaction of Some Boron–Nitrogen Compounds with Organic Isocyanates*", 1963.
T. Hirabayaski, H. Imaeda, K. Itoh, S. Sakai and Y. Ishii, "*Insertion Reactions of Diethylaluminum Derivatives I. Reaction of Diethylaluminum Ethanethiolate and Diethylaluminum Dimethylamide with Isocyanates or Isothiocyanates*", J. Organometal Chem., 19(1969)299–308.
R. Brotherton and H. Steinberg, "*Direct Preparation of Some Cyclic Boron–Nitrogen Compounds from Alkoxyboranes*", 1961.

*Primary Examiner*—Bernard Lipman

[57] ABSTRACT

The compositions of this invention comprise uncrosslinked reaction mixtures comprising (1) at least one organic monomer, oligomer or polymer comprising a multiplicity of organic, electrophilic substituents, and (2) at least one metal-containing polymer.

Preferred compositions of this invention comprise reaction mixtures comprising (1) at least one organic monomer, oligomer or polymer comprising a multiplicity of organic, electrophilic substituents, and (2) at least one of: at least one of: a polymer selected from the group consisting of silicon-nitrogen polymers, aluminum-nitrogen polymers and boron-nitrogen polymers comprising a multiplicity of sequentially bonded repeat units.

28 Claims, No Drawings

ORGANIC/INORGANIC POLYMERS

This is a continuation of application Ser. No. 08/148,044 filed on Nov. 5, 1993 now abandoned.

BACKGROUND OF THE INVENTION

Metal-containing polymers have been used extensively in the past to prepare ceramic objects due to the high ceramic "char" yields which result when such polymers are heated to temperatures approaching 1000° C. Such polymers have thus proven useful for such applications as ceramic powder binders, as precursors to ceramic coatings, as ceramic fiber precursors, and as powder carriers for molding applications. However, despite the high thermal stability of such polymers, and their ability to form ceramic compositions upon thermal decomposition, the mechanical strength of such polymers has limited their utility in room temperature applications.

In contrast, while organic polymers demonstrate marginal high temperature performance, their strength and durability at ambient temperature has resulted in widespread application of organic polymers where metals or wood had previously been used.

Block copolymers have been prepared from a variety of organic polymer systems. U.S. Pat. No. 5,229,468, entitled "Polymer Precursor for Silicon Carbide/Aluminum Nitride Ceramics" which issued in the name of Jensen on Jul. 20, 1993, describes recent work to prepare a novel block copolymer which is a ceramic precursor and which incorporates alternately a multiplicity of units comprising Al—N bonded segments with a multiplicity of units comprising Si—N bonded segments.

Such block copolymers, whether wholly organic in nature or wholly inorganic in nature have been shown to exhibit the desirable characteristics of each of their component compositions.

Recently there has also been some effort in preparing mixed organic/inorganic polymer compositions by the hydrolysis of $Si(OR)_4$ compounds in which R is an unsaturated, polymerizable organic group such as vinyl or allyl, or an acrylate or methacrylate-based group. This work has been motivated by limitations which derive from the insolubility of many important engineering polymers within sol-gel solutions. Free-radical curing of such "sol-gel" processed monomers results in mixed systems demonstrating some of the useful properties of the organic components used in the synthesis of the monomers as well as some of the desirable properties of the inorganic components. Typically, such systems comprise semi-interpenetrating networks composed of linear organic polymers and a three-dimensional $SiO_2$ network. Representative of such an approach is work described by B. M. Novak and C. Davies in *Macromolecules*, 991, 24, 5481–5483.

Other work (see, for example, U.S. Pat. No. 4,448,939, entitled "Polyurethanes Prepared Using Poly(Silyldiamines)"), which issued in the names of Fasolka et al. on May 15, 1984, is based on the reaction of —Si— NH—R— (silyl amine) groups with organic isocyanates. In these compositions polyurethanes comprising the reaction product of an organic polyisocyanate and a poly(silyldiamine) are described. This differs from the present invention wherein metal-nitrogen polymers comprising a multiplicity of metal-nitrogen bonds bonded in sequence serve as the source of electron density for reaction with the multifunctional organic electrophile. Thus, for example, in a preferred embodiment of the present invention, the silicon-containing polymers of the instant invention comprise repeat units in which each nitrogen atom is bonded to two silicon atoms.

Similar work by A. A. Zhdanov et. al. in *Polymer Science U.S.S.R.*, Vol. 23, No. 11, pp 2687–2696 (1981), describes the reaction of a nitrogen-hydrogen bond present in the silyl amine end groups of linear polysilazasiloxanes with carbonate moieties in mixed polycarbonate silazasiloxane compositions. Such silyl amine end groups are formed by the reaction of hydroxyl groups in the organic fraction of the composition with cyclosilazane rings, resulting in ring opening and concurrent formation of the reactive $Si—NH_2$ moiety. In contrast to the reaction of Zhdanov, the reactivity described in the instant invention comprises the reaction of metal-nitrogen bonds with multifunctional, organic, electrophilic reagents. When the metal-nitrogen polymer comprises, for example, silicon, it is the Si—N bond which reacts with the organic electrophile.

U.S. Pat. Nos. 4,929,704 entitled "Isocyanate- and Isothiocyanate-Modified Polysilazane Ceramic Precursors" which issued in the name of Schwark on May 29, 1990; U.S. Pat. No. 5,001,090 entitled "Silicon Nitride Ceramics from Isocyanate- and Isothiocyanate-Modified Polysilazanes" which issued in the name of Schwark on Mar. 19, 1991; and U.S. Pat. No. 5,021,533 entitled "Crosslinkable Poly(thio)ureasilazane Composition Containing a Free Radical Generator" which issued in the name of Schwark on Jun. 4, 1991, describe the preparation of organic isocyanate-modified silazane polymers by the reaction of less than about 30 weight percent of an organic isocyanate with a polysilazane comprising Si—H bonds, the by-product of reaction being hydrogen gas. Similarly, U.S. Pat. No. 5,032,649 entitled "Organic Amide-Modified Polysilazane Ceramic Precursors" which issued in the name of Schwark on Jul. 16, 1991, and U.S. Pat. No. 5,155,181 entitled "(Thio)amide-Modified Silazane Polymer Composition Containing a Free Radical Generator" which issued in the name of Schwark on Oct. 13, 1992, teach the preparation of organic amide-modified silazane polymers by the reaction of less than 30 wt. % of an organic amide with a polysilazane comprising Si-H bonds, the by-product of reaction being hydrogen gas. These polymers are described as being useful for the preparation of ceramic materials by pyrolysis processing. None of these patents describe a crosslinkable, organic/inorganic "hybrid" polymer comprising a substantial (e.g., >30wt. %) fraction of the organic component, nor the preparation of crosslinkable, organic/inorganic "hybrid" polymers from electrophiles other than isocyanates or amides. Correspondingly, the utility of such polymers in applications not involving pyrolysis to a ceramic material is not described, nor their further reaction with organic electrophiles comprising a multiplicity of electrophilic groups to generate organic/inorganic "hybrid" polymers.

U.S. Pat. No. 3,239,489, entitled "Polyurea-silazanes and Process of Preparation" which issued in the names of Fink et al. on Mar. 8, 1966, describes the preparation of linear as well as crosslinked polymers by the reaction of certain silazanes with di- or polyfunctional isocyanates. By reacting such compositions, both linear and crosslinked polymers can be prepared. However, Fink et al. do not describe the preparation of uncrosslinked reaction products which can subsequently be crosslinked through a defined mechanism which is distinct from the reaction of the silazane with the di- or polyfunctional isocyanate. Such reactivity for isocyanate- and amide-modified polymers such as those described in the preceding paragraph is also not addressed. Furthermore, the preferred liquid reaction products of the instant invention are not described.

To date, no art has described the synthesis of uncrosslinked, but crosslinkable inorganic/organic "hybrid" polymers by the reaction of substantial quantities (e.g., >30 wt. %) of an organic electrophile with a polysilazane, suitable crosslink mechanisms, or the crosslinked compositions obtained therefrom. For other silicon-nitrogen based polymers, as well as aluminum-nitrogen polymers, boron-nitrogen polymers, and block copolymers and terpolymers prepared from, for example, aluminum-nitrogen polymers, boron-nitrogen polymers, and silicon-nitrogen polymers, no systems are known. While the metal-nitrogen polymers suitable for the practice of this invention may comprise any metal, the preferred compositions of this invention comprise metal-nitrogen polymers containing the metals silicon, aluminum and boron. Crosslinking may be effected by, for example, thermal, radiation, ionic, or radical-based mechanisms.

It has been discovered that crosslinked, covalently-bonded block copolymers comprising (1) organic segments derived from organic electrophiles, and (2) inorganic fractions derived from segments of metal-nitrogen polymers, demonstrate the high mechanical strengths of their wholly organic counterparts, as well as the extended high temperature performance of their wholly inorganic counterparts. These characteristics overcome the limitations encountered in wholly organic or wholly inorganic polymers. Some limitations of wholly organic or wholly inorganic polymer have been discussed above. Furthermore, the instant invention provides polymers with properties heretofore unachieveable. The unexpected superior properties of the polymers of the instant invention result from the synergism of organic and inorganic components of the polymers.

SUMMARY OF THE INVENTION

The compositions of this invention comprise uncrosslinked reaction mixtures comprising (1) at least one organic monomer, oligomer or polymer comprising a multiplicity of organic, electrophilic substituents, and (2) at least one metal-containing polymer.

Preferred compositions of this invention comprise reaction mixtures comprising (1) at least one organic monomer, oligomer, or polymer comprising a multiplicity of organic, electrophilic substituents, and (2) a polymer selected from the group consisting of silicon-nitrogen polymers, aluminum-nitrogen polymers, and boron-nitrogen polymers comprising a multiplicity of sequentially bonded repeat units of the form (a), (b), (c), and (d),

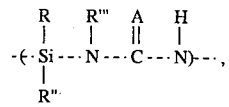  (a)

  (b)

  (c)

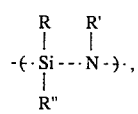  (d)

respectively, where R, R', R", and R'''=hydrogen, alkyl, alkenyl, or aryl and A=O or S, mixtures of two or more polymers comprising two or more of the structural units (a), (b), (c) and (d), metal-crosslinked polymers comprising one or more of the structural units (a), (b), (c) and (d), and block copolymers comprising two or more of the structural units (a), (b), (c) and (d). These reaction mixtures react to form novel, uncrosslinked "hybrid" compositions which incorporate the at least one organic monomer, oligomer, or polymer into the structure of the one or more metal-containing polymers and which, in a subsequent step, can be crosslinked. In a preferred embodiment, the reaction product of the at least one organic electrophile and the one or more metal-nitrogen polymers is a liquid which can be cured to a rigid solid by crosslinking after processing to a desired shape. The cure is effected by providing crosslinking through at least one of a thermal, radiation, radical, or ionic-based crosslinking mechanism.

It is further preferred that the reaction product comprise sites of organounsaturation such as alkenyl groups. Where R: alkenyl, these compositions may then be crosslinked by supplying an energy input in the form of thermal energy or radiation, such as ultraviolet radiation or electron beam radiation, to crosslink the "hybrid" compositions by activating alkenyl-based polymerization of the alkenyl groups within these compositions. When the reaction product is a liquid, such crosslinking provides a mechanism for curing to a rigid solid after processing to the desired shape.

The organic monomers, oligomers, or polymers comprising a multiplicity of electrophilic substituents suitable for the practice of this invention may be defined as organic monomers, oligomers or polymers which contain a multiplicity of one or more reactive groups which may attack the electron density of the Si—N, Al—N, or B—N bonds of the metal-containing polymer, resulting in the breaking of these bonds and, subsequently, the formation of new bonds. Alternatively, when R'=H the organic monomers, oligomers, or polymers may preferentially react at the N—H bonds of the metal-containing polymer. Either mechanism provides for the incorporation of the at least one organic monomer, oligomer or polymer into the structure of the metal-containing polymers. It is preferred that such organic electrophiles comprise liquids to increase the likelihood for reaction of the at least one organic monomer, oligomer or polymer with the one or more metal-nitrogen polymers.

Typical organic monomers, oligomers or polymers suitable for the practice of this invention include, for example, multifunctional organic isocyanates, multifunctional compounds comprising amide linkages such as polyamides, multifunctional epoxides, multifunctional compounds comprising ester linkages, such as polyacrylates, polycarbonates, polyvinylacetates, or polyesters, or multifunctional esters such as dimethyl adiptate, and multifunctional organic acids such as polyacrylic acid.

A wide variety of such block copolymers are possible, those derived from, for example, silicon-nitrogen polymers, aluminum-nitrogen polymers, and boron-nitrogen polymers comprising a multiplicity of sequentially bound repeat units of the form (a), (b), (c), and (d), as follows:

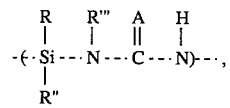  (a)

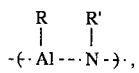  (b)

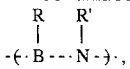

and

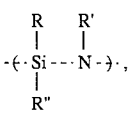

where R, R', R", and R'''=hydrogen, alkyl, alkenyl, or aryl and A=O or S, have demonstrated remarkable high temperature as well as ambient temperature performance characteristics. Liquid polymers containing repeat units wherein R=alkenyl are particularly advantageous, due to their tendency to generate liquid reaction products with the organic electrophiles and their ability to generate rigid, crosslinked structures through metal-alkenyl group crosslinking after the reaction product has been shaped in a forming process such as molding. Alternatively, crosslinked compositions may be obtained by heating such polymers or by providing groups which provide for chemical crosslinking through an ionic mechanism.

Such block copolymers are prepared by reacting these metal-nitrogen polymers with at least one organic monomer, oligomer, or polymer comprising a multiplicity of organic, electrophilic substituents to prepare an uncrosslinked composition which is then crosslinked in a subsequent processing step. In a preferred embodiment, the at least one organic monomer, oligomer, or polymer comprising a multiplicity of organic, electrophilic substituents is a liquid.

Furthermore, it is preferred that the reaction product of the at least one organic electrophile with a metal-nitrogen polymer comprises a liquid which can be cured to a rigid solid after processing to a desired shape. The curing can be accomplished by thermal means, or by chemically-induced crosslinking by either an ionic or a free radical mechanism. It is especially advantageous when the reaction product of the at least one organic electrophile with the metal-nitrogen polymer comprises sites of organounsaturation such as alkenyl groups. In a subsequent step, alkenyl-based crosslinking in the reaction product is effected by providing an energy input in the form of, for example, heat or irradiation which can be used to provide the mechanism for curing the liquid reaction product to a rigid solid after processing to the desired shape. More preferred compositions wherein R: vinyl can additionally comprise a free radical initiator, which promotes vinyl crosslinking in the reaction product at relatively low temperatures. Preferred compositions wherein R=allyl can additionally comprise a UV initiator which promotes crosslinking upon UV irradiation. Suitable polymers also include mixtures of two or more polymers comprising two or more of the structural units (a), (b), (c), and (d), metal-crosslinked polymers comprising one or more of the structural units (a), (b), (c) and (d), and block copolymers comprising two or more of the structural units (a), (b), (c) and (d).

Representative of polymers comprising the repeat units (a) are those polymers described, for example, in U.S. Pat. No. 4,929,704 entitled "Isocyanate- and Isothiocyante-Modified Polysilazane Ceramic Precursors" which issued in the name of Schwark on May 29, 1990; U.S. Pat. No. 5,001,090 entitled "Silicon Nitride Ceramics from Isocyanate- and Isothiocyante-Modified Polysilazanes" which issued in the name of Schwark on Mar. 19, 1991; and U.S. Pat. No. 5,021,533 entitled "Crosslinkable Poly(thio)ureasilazane Composition Containing a Free Radical Generator" which issued in the name of Schwark on Jun. 4, 1991; and polymers described in references contained in these U.S. Patents. The entire disclosures of these U.S. Patents and references contained in these U.S. Patents are specifically incorporated herein by reference. Representative of polymers comprising the repeat units (b) are those polymers described, for example, in U.S. Pat. No. 3,505,246 entitled "Nitrogen Aluminum Hydride Polymers and Methods of Making the Same" issued in the names of Ehrlich et al. on Apr. 7, 1970; U.S. Pat. No. 4,687,657 entitled "Fabrication of SiC—Al N Alloy" issued in the names of Clark et al. on Aug. 18, 1987; U.S. Pat. No. 4,696,968 entitled "Melt-Formable Organoaluminum Polymer" issued in the name of Tebbe on Sep. 29, 1987, and U.S. patent application Ser. No. 07/907,726, U.S. Pat. No. 5,276,105 entitled "Polymer Precursors for Aluminum Nitride" which was filed in the name of Jensen and allowed Jul. 22, 1993, and polymers described in references contained in these U.S. Patents and allowed U.S. Patent Applications. The entire disclosures of these U.S. Patents and U.S. Patent Applications and references contained in these U.S. Patents and U.S. Patent Applications are specifically incorporated herein by reference. Representative of polymers comprising the repeat units (c) are those polymers described, for example, in the article by R. T. Paine and C. K. Narula, *Chem. Rev.*, 90 (1990) 73–91 and polymers described in references contained therein. The entire disclosures of which are specifically incorporated herein by reference. Representative of polymers comprising the repeat units (d) are those polymers described, for example, in U.S. Pat. No. 4,482,669 entitled "Preceramic Organosilazane Polymers" which issued in the names of Seyferth et al. on Nov. 13, 1984; U.S. Pat. No. 4,774,312 entitled "Polydisilacyclobutasilazanes" which issued in the name of Burns on Sep. 27, 1988; U.S. Pat. No. 4,689,252 entitled "Polysilazane Composition which can Crosslink in the Presence of a Metal Compound Catalyzing a Hydrosilylation Reaction" which issued in the names of Lebrun et al. on Aug. 25, 1987; U.S. Pat. No. 4,612,383 entitled "Method of Producing Polysilazanes" which issued in the names of Laine et al. on Sep. 16, 1986; U.S. Pat. No. 4,675,424 entitled "Method of Making Polysilazanes" which issued in the names of King III et al. on Jun. 23, 1987; U.S. Pat. No. 4,722,988 entitled "Organopolysilazane Composition Containing Free Radical Generators and Capable of Being Crosslinked by an Energy Input" which issued in the names of Porte et al. on Feb. 2, 1988; U.S. Pat. No. 5,155,181 entitled "(Thio)amide-Modified Silazane Polymer Composition Containing a Free Radical Generator" which issued in the name of Schwark on Oct. 13, 1992; U.S. Pat. No. 5,032,649 entitled "Organic Amide-Modified Polysilazane Ceramic Precursors" which issued in the name of Schwark on Jul. 16, 1991; U.S. Pat. No. 4,929,704 entitled "Isocyanate- and Isothiocyante-Modified Polysilazane Ceramic Precursors" which issued in the name of Schwark on May 29, 1990; U.S. Pat. No. 5,001,090 entitled "Silicon Nitride Ceramics from Isocyanate- and Isothiocyante-Modified Polysilazanes" which issued in the name of Schwark on Mar. 19, 1991; U.S. Pat. No. 5,021,533 entitled "Crosslinkable Poly(thio)ureasilazane Composition Containing a Free Radical Generator" which issued in the name of Schwark on Jun. 4, 1991; U.S. Pat. No. 3,853,567 entitled "Production of Shaped Articles of Homogeneous Mixtures of Silicon Carbide and Nitride" which issued in the name of Verbeck on Dec. 10, 1974, and polymers described in references contained therein. The entire disclosures of these U.S. Patents and the references contained in these U.S. Patents are specifically incorporated herein by reference. Representative of polymer mixtures of polymers comprising the structural units (b) and (c) are those polymers described, for example, in U.S. Pat. No. 4,764,489 entitled "Preparation of Mixed Boron and Aluminum Nitrides" which issued in the name of Bolt on Aug. 16, 1988, and polymers described in references contained therein, the entire disclosures of which are specifically incorporated herein by reference. Representative of polymer mixtures of polymers comprising the structural units (b) and (d) are those polymers described, for example, in U.S. Pat. No. 5,229,468, entitled "Polymer Precursor for Silicon Carbide/Aluminum Nitride Ceramics" which issued in the name of Jensen on Jul. 20, 1993, and polymers described in references contained therein. The entire disclosures of U.S. Pat. No. 5,229,468 and the references contained therein are specifically incorporated herein by reference. Representative of polymer mixtures of polymers comprising the structural units (c) and (d) are those polymers described, for example, in U.S. Pat. No. 5,164,344 entitled "Borosilazanes as Binders for the Preparation of Sintered Silicon Carbide Monoliths" which issued in the name of Zank on Nov. 17, 1992, and polymers described in references contained therein. The entire disclosures of U.S. Pat. No. 5,164,344 and the reference contained therein are specifically incorporated herein by reference.

DETAILED DESCRIPTION OF THE INVENTION

The compositions of this invention comprise uncrosslinked reaction mixtures comprising (1) at least one organic monomer, oligomer or polymer comprising a multiplicity of organic, electrophilic substituents, and (2) at least one metal-containing polymer.

Preferred compositions of this invention comprise reaction mixtures comprising (1) at least one organic monomer, oligomer or polymer comprising a multiplicity of organic, electrophilic substituents, and (2) at least one of: at least one of: a polymer selected from the group consisting of silicon-nitrogen polymers, aluminum-nitrogen polymers and boron-nitrogen polymers comprising a multiplicity of sequentially bonded repeat units of the form (a), (b), (c), and (d), below

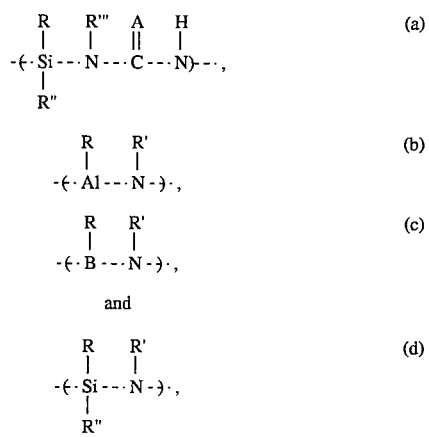

respectively, where R, R', R", and R'": hydrogen, alkyl, alkenyl, or aryl groups and A=O or S; mixtures of two or more polymers comprising two or more of the structural units (a), (b), (c) and (d); metal-crosslinked polymers comprising one or more of the structural units (a), (b), (c) and (d); and block copolymers comprising two or more of the structural units (a), (b), (c) and (d). These reaction mixtures react to form novel, uncrosslinked "hybrid" compositions which incorporate the at least one organic monomer, oligomer, or polymer into the structure of the one or more metal-containing polymers and which, in a subsequent step, can be crosslinked. In a preferred embodiment, the reaction product of the at least one organic monomer, oligomer or polymer and the one or more metal-nitrogen polymers is a liquid which can be cured to a rigid solid by crosslinking after processing to a desired shape. The cure is effected by providing crosslinking through, for example, at least one of a thermal, radiation, radical, or ionic-based crosslinking mechanism.

It is further preferred that the reaction product comprise sites of organounsaturation such as alkenyl groups. Where R=alkenyl, these compositions may then be crosslinked by supplying an energy input in the form of, e.g., thermal energy or radiation, such as ultraviolet radiation or electron beam radiation, to crosslink the "hybrid" compositions by activating alkenyl-based polymerization of the alkenyl groups within these compositions. When the reaction product is a liquid, such crosslinking provides a mechanism for curing to a rigid solid after processing to the desired shape.

In another preferred embodiment of the present invention, the compositions comprise uncrosslinked reaction mixtures comprising (1) at least one organic monomer, oligomer or polymer comprising a multiplicity of organic, electrophilic substituents, and (2) at least one of: a polymer selected from the group consisting of silicon-nitrogen polymers, aluminum-nitrogen polymers, and boron-nitrogen polymers comprising a multiplicity of sequentially bonded repeat units of the form (a), (b), and (c),

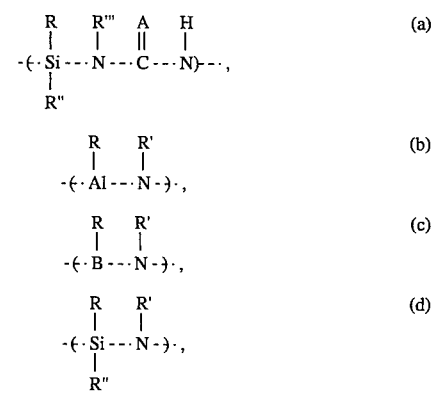

respectively, where R, R', R" and R'"=hydrogen, alkyl, alkenyl, or aryl and A=O or S; mixtures of two or more polymers comprising two or more of the structural units (a), (b), (c) and (d); metal-crosslinked polymers comprising one or more of the structural units (a), (b), (c) and (d); and block copolymers comprising two or more of the structural units (a), (b), (c) and (d) which, subsequent to reaction to form novel "hybrid" compositions, can be crosslinked to obtain high performance materials. Preferred are compositions which comprise either liquid metal-nitrogen polymers, liquid organic electrophiles, or both liquid metal-nitrogen polymers and liquid organic electrophiles. Preferred compositions of the instant invention further comprise compositions wherein R=alkenyl, more preferably wherein at least one the original metal-containing polymer, metal-crosslinked polymer, or block copolymer is present, for example, at greater than about 30 wt. % of the total weight of the at least one metal-nitrogen polymer plus the at least one organic electrophile and comprises the repeat units (a) wherein R=vinyl, and most preferably wherein the at least one original metal-containing polymer, metal-crosslinked polymer, or block copolymer comprises the repeat units (a) wherein R=vinyl, and R'=hydrogen.

The compositions of the instant invention may further comprise crosslinkable compositions comprising the uncrosslinked reaction products of a reaction mixture comprising (1) at least onen organic monomer, oligomer or polymer comprising a multiplicity of organic, electrophilic substituents, and (2) at least one of: a polymer selected from the group consisting of silicon-nitrogen polymers, aluminum-nitrogen polymers, and boron-nitrogen polymers comprising a multiplicity of sequentially bonded repeat units selected, for example, from the form (a), (b), (c) and (d), below,

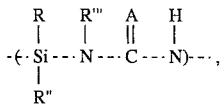  (a)

  (b)

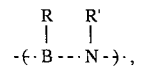  (c)

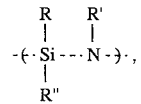  (d)

respectively, where R, R', R", and R'"=hydrogen, alkyl, alkenyl, or aryl and A=O or S; mixtures of two or more polymers comprising two or more of the structural units (a), (b), (c) and (d); metal-crosslinked polymers comprising one or more of the structural units (a), (b), (c) and (d); and block copolymers comprising two or more of the structural units (a), (b), (c) and (d), which can be crosslinked to a high performance material in a subsequent processing step. Preferred reacted compositions are compositions which are liquids. Preferred compositions of the instant invention further comprise sites of organounsaturation such as alkenyl groups. Preferred compositions of the instant invention further comprise a reaction product wherein R=alkenyl, more preferably wherein the at least one original metal-containing polymer, metal-crosslinked polymer, or block copolymer is present at greater than about 30 wt. % of the total weight of metal-nitrogen polymer plus the at least one organic electrophile and comprises the repeat units (a) wherein R=vinyl, and most preferably wherein the at least one original metal-containing polymer, metal-crosslinked polymer, or block copolymer comprises the repeat units (a) wherein R=vinyl, and R'=hydrogen.

The compositions of the instant invention may further comprise the crosslinked reaction products of an uncrosslinked reaction mixture comprising (1) at least one organic monomer, oligomer, or polymer comprising a multiplicity of organic, electrophilic substituents, and (2) at least one of: a polymer selected from the group consisting of silicon-nitrogen polymers, aluminum-nitrogen polymers, and boron-nitrogen polymers comprising a multiplicity of sequentially bonded repeat units of the form (a), (b), (c) and (d), below

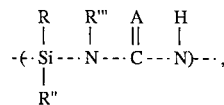  (a)

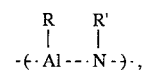  (b)

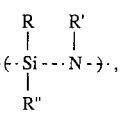  (c)

and

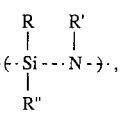  (d)

respectively, where R, R', R" and R'"=hydrogen, alkyl, alkenyl, or aryl and A=O or S; mixtures of two or more polymers comprising two or more of the structural units (a), (b), (c) and (d); metal-crosslinked polymers comprising one or more of the structural units (a), (b), (c) and (d); and block copolymers comprising two or more of the structural units (a), (b), (c) and (d).

Where R or R'=alkenyl, these compositions can been crosslinked by supplying an energy input in the form of, for example, thermal energy or radiation, such as ultraviolet radiation or electron beam radiation, to crosslink the "hybrid" compositions by activating alkenyl-based polymerization of the alkenyl groups within these compositions. This crosslinking effect is believed to be most advantageous when the crosslinkable reaction product is a liquid, and it is desired to shape-stabilize the composition by crosslinking to a rigid solid. Preferred compositions of the instant invention thus further comprise a reaction product wherein R=alkenyl, more preferably wherein the at least one original metal-containing polymer, metal-crosslinked polymer, or block copolymer is present at greater than 30 weight percent of the total weight of metal-nitrogen polymer plus organic electrophile and comprises the repeat units (a) wherein R: vinyl, and most preferably wherein the at least one original metal-containing polymer, metal-crosslinked polymer, or block copolymer comprises the repeat units (a) wherein R=vinyl, and R'=hydrogen. R or R' can also comprise a group such as an epoxy or acrylate-based group which can provide for ionic crosslinking of the reacted "hybrid" composition. When Si—H bonds and vinyl groups are present in the reacted composition, a hydrosilylation mechanism may be used to crosslink the reacted composition. Alternatively, the thermal decomposition characteristics of the metal-nitrogen polymer backbone may be used to advantage in generating the crosslinked structure once the reaction product of the metal-nitrogen polymer with the multifunctional electrophile is obtained. Such mechanisms may be used when these polymers are used as preceramic polymers (without combining them with organic electrophiles) and they are being converted to ceramic materials by pyrolysis crosslinking.

Although not required, it is desirable for the at least one metal-nitrogen polymer to be present in an amount of at least about 10 wt. % or more of the total composition based on the combined weight of metal-nitrogen polymer and organic electrophile. Preferably, it is present at between about 15 weight percent and 50 weight percent, and most preferably, at between about 20 weight percent and 30 weight percent. For the purposes of this invention the term "metal-nitrogen polymer" shall mean a composition containing repeat units comprising metal-to-nitrogen bonds. The term "metal-nitrogen polymers" as used herein is meant to include cyclic oligomers, cage compounds, and ring-based and linear polymers.

The organic monomers, oligomers, or polymers comprising a multiplicity of electrophilic substituents suitable for the practice of this invention are defined as organic monomers, oligomers or polymers which contain a multiplicity of one or more reactive groups which may attack the electron density of the Si—N, Al—N, or B—N bonds of the metal-containing polymers, resulting in the breaking of these bonds and, subsequently, the formation of new bonds. Alternatively, when R'=H the organic monomers, oligomers, or polymers may preferentially react at the N—H bonds of the at least one metal-containing polymer. Either mechanism provides for the incorporation of the at least one organic monomer, oligomer, or polymer into the structure of the metal-containing polymers. It is preferred that such organic electrophiles comprise liquids to increase the likelihood for reaction of the at least one organic monomer, oligomer or polymer with the one or more metal-nitrogen polymers.

Typical organic monomers, oligomers, or polymers suitable for the practice of this invention include, for example, multifunctional organic isocyanates, multifunctional compounds comprising amide linkages such as polyamides, multifunctional epoxides, multifunctional compounds comprising ester linkages, such as polyacrylates, polycarbonates, polyvinylacetates, or polyesters, multifunctional esters such as dimethyl adipate, diallyl phthalate, and diethylene glycol bisallyl carbonate, and multifunctional organic acids such as polyacrylic acid.

Since the preferred compositions of the instant invention comprise metal-containing polymers which contain Si—N bonds, it is informative to describe the reactions of typical monomeric electrophiles with such polymers.

Monofunctional isocyanates are known to react with silicon-nitrogen polymers by inserting into the Si—N bond of the polymers as shown in Equation 1:

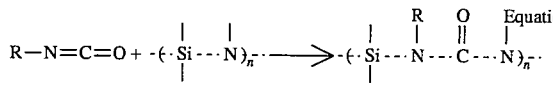

Equation 1

Such reactivity is described in U.S. Pat. Nos. 4,949,704; 5,001,090 entitled "Silicon Nitride Ceramics from Isocyanate- and Isothiocyante-Modified Polysilazanes" which issued in the name of Schwark on Mar. 19, 1991; and U.S. Pat. No. 5,021,533 entitled "Crosslinkable Poly(thio)ureasilazane Composition Containing a Free Radical Generator" which issued in the name of Schwark on Jun. 4, 1991.

Monofunctional amides are also known to react with silicon-nitrogen polymers. While not wishing to be bound by theory, it is believed that the reaction proceeds by insertion of the amide into the Si—N bond of the polymer as shown in Equation 2:

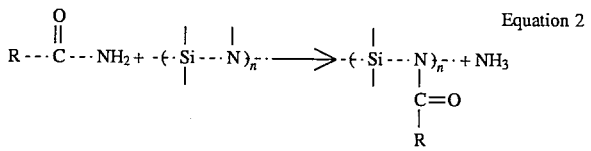

Equation 2

Such reactivity is described in U.S. Pat. Nos. 5,032,649 entitled "Organic Amide-Modified Polysilazane Ceramic Precursors" which issued in the name of Schwark on Jul. 16, 1991; and 5,155,181 entitled "(Thio)amide-Modified Silazane Polymer Composition Containing a Free Radical Generator" which issued in the name of Schwark on Oct. 13, 1992.

In the case of the reaction of a silicon-nitrogen polymer with an organic isocyanate, a simple addition of the electrophilic N=C bond across the Si—N bond is believed to occur. When a silicon-nitrogen polymer reacts with an organic amide, reaction is believed to occur across the Si—N bond with the evolution of ammonia as a by-product.

In both cases an Si—N bond is broken and in both cases new Si—N bonds form which comprise a silicon atom from the silicon-nitrogen polymer and nitrogen atom originating in the monofunctional, organic monomer containing the electrophilic substituent.

On the other hand, when silicon-nitrogen polymers comprising nitrogen-hydrogen bonds react with monofunctional organic epoxides or monofunctional organic esters, reaction may occur at the N—H bond of the silicon polymer (Equations 3 and 4):

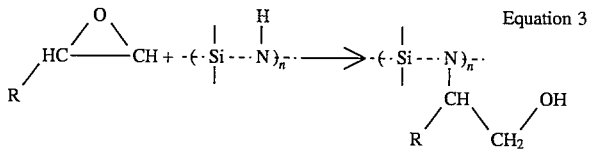

Equation 3

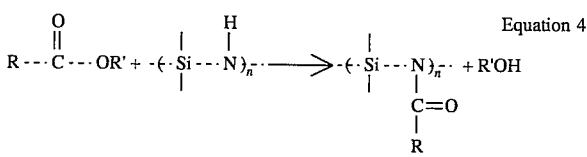

Equation 4

Again, the reaction with a monofunctional organic epoxide would appear to be a simple addition reaction, whereas the reaction with a monofunctional organic ester appears to generate an alcohol as a by-product. In both cases, new bonds are formed which incorporate the organic reactant into the silicon-nitrogen polymer structure.

Subsequent crosslinking reactions within the co-reacted compositions shown in Equations 1 through 4 are believed to then occur.

Similar reactivity has been observed for boron-nitrogen polymers as, for example, documented in the reaction of a borazine with monofunctional isocyanates [Cragg, R. H., and M. F. Lappert, *J. Chem. Soc.* (London) 1964, 2108; Beyer, H., J. W. Dawson, H. Jenne and K. Niedenzu, *J. Chem. Soc.* (London), 1964, 2115]:

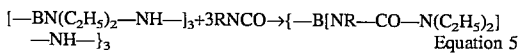

Equation 5 or the reaction of a dialkyl aluminum amine with monofunctional isocyanates [T. Hirabayashi, H. Imaeda, K. Itoh, S. Sakai and Y. Ishii, *J. Organometal. Chem.*, 19 (1969) 299]:

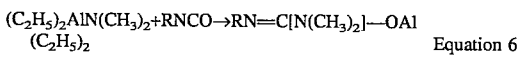

Equation 6

The organic, electrophilic compositions suitable for the practice of the instant invention, however, are not believed to be monofunctional. These compositions comprise at least one organic monomer, oligomer, or polymer comprising a multiplicity of electrophilic substitutents. For the purposes of this invention, the term monomer is defined as a chemical compound which comprises only one repeat unit, the term oligomer is defined as a chemical compound which comprises a few repeat units (generally from about 2 to about 30), and the term polymer is defined as a compound which comprises a large number of repeat units (generally greater than about 30). A multiplicity of electrophilic substituents is defined as a number of reactive groups within the same organic monomer, oligomer, or polymer which cause Si—N or N—H bond scission within a silicon-nitrogen coreactant polymer which is greater than one. While not essential for the purposes of this invention, it is desirable that the at least one organic monomer, oligomer, or polymer is present as about 30 wt. % or more of the total composition. Preferably, the at least one organic monomer, oligomer, or polymer is present at between about 50 weight percent and 85 weight percent, and most preferably, at between about 70 weight percent and 80 weight percent.

Suitable monomeric, oligomeric, or polymeric organic isocyanates which may be used according to this invention include, but are not limited to, aliphatic, cycloaliphatic, araliphatic, aromatic, heterocyclic polysisocyanates and mixtures thereof. Suitable polyisocyanates which may be used in the process of this invention include, but are not limited to, p,p'-diphenylmethane diisocyanate, phenylene diisocyanate, chlorophenylene diisocyanate, tolylene diisocyanate, m-xylylene diisocyanate, benzidine diisocyanate, naphthylene diisocyanate, tetramethylene diisocyanate, pentamethylene diisocyanate, hexamethylene diisocyanate, decamethylene diisocyanate, and thiodipropyl diisocyanate. Other polyisocyanates, polyisothiocyanates and their derivatives may be equally employed. Fatty diisocyanates may be equally employed. Another group of suitable polyisocyanates are so-called modified polyisocyanates, i.e., polyisocyanates containing carbodiimide groups, allophanate groups, isocyanurate groups, urea groups, amide groups, imide groups, or biuret groups. Polyisocyanates suitable for modification in this way include, for example, aliphatic, cycloaliphatic, araliphatic, aromatic and heterocyclic polyisocyanates. It is generally preferred to use commercially readily available polyisocyanates, e.g. tolylene-2,4- and -2,6-diisocyanate and any mixtures of these isomers, polyphenyl-polymethylene-isocyanates obtained by aniline-formaldehyde condensation, followed by phosgenation, and polyisocyanates which contain carbodiimide groups, urethane groups, allophanate groups, isocyanurate groups, urea groups, imide groups or biuret groups.

Suitable monomeric, oligomeric, and polymeric esters which may be used according to this invention include, but are not limited to, difunctional esters such as dimethyl adipate, diethyl succinate, and dimethyl glutarate as well as the polyesters of aromatic dibasic acids and alkylene glycols. The polyesters also may be derived from, for example, a mixture of aromatic dicarboxylic acids, and one or more diols. Examples of symmetrical aromatic dicarboxylic acids include terephthalic acid, dibenzoic acid, ethylene bis-p-oxy benzoic acid, tetramethylene bis-p-oxy benzoic acid, and 2,6-naphthalic acid. Other aromatic dicarboxylic acids which can be used in conjunction with the symmetrical dicarboxylic acid include, for example, o-phthalic, isophthalic acid, etc.

Representative glycols which are reacted with the dibasic acids to form the desired polyesters include, for example, ethylene glycol, 1,2- and 1,3-propanediol, 1,4-butanediol, neopentyl glycol, 1,6-hexanediol, polyethylene glycol, etc.

Also useful in the present invention are polyesters prepared from, for example, acyclic dicarboxylic acids and glycols such as those described above. Specific examples of the acyclic dicarboxylic acids suitable to prepare the polyesters useful in the practice of this invention include adipic acid, pimelic acid, suberic acid, azelaic acid, oxy-dibutyric acid, sebacic acid, 5-oxa-1,10-decanedioic acid, 4-n-propyl suberic acid, dodecane dioic acid, tridecane dioic acid, etc.

Particularly useful combinations of aromatic and aliphatic dicarboxylic acids used in the preparation of copolyesters useful in the present invention include: terephthalic acid, azelaic acid and pentamethyleneglycol; terephthalic acid, isophthalic acid and adipic acid; terephthalic acid, isophthalic acid, adipic acid and sebacic acid; terephthalic acid, isophthalic acid, adipic acid and ethylene glycol; etc. Copolyesters of such mixtures may be prepared directly from the above-identified dicarboxylic acids, or the copolyesters may be prepared from the lower alkyl exters of said dicarboxylic acids such as dimethyl terephthalate, dimethyl isophthalate, dimethyl sebacate, dimethyl adipate, etc. Procedures for preparing copolyesters useful in combination with the metal-nitrogen polymers in this invention are described in, for example, U.S. Pat. Nos. 2,623,033 and 2,892,747, both of which patents are specifically incorporated herein in their entirety by reference, including their disclosure of linear copolyesters derived at least in part from symmetrical aromatic dicarboxylic acids.

The reaction of a metal-nitrogen polymer with the above-mentioned multifunctional isocyanate monomers, oligomers, or polymers may proceed with or without a catalyst. Preferred catalysts comprise, for example, organic tin compounds. The organic tin compounds preferably comprise tin salts of carboxylic acids such as tin acetate, tin octoate, tin ethyl hexoate and tin alurate and the dialkyl tin salts of carboxylic acid such as dibutyl tin diacetate, dibutyl tin dilaurate, dibutyl tin maleate or dioctyl tin diacetate.

Bases which contain nitrogen such as tetraalkyl ammonium hydroxides, alkali metal hydroxides such as sodium hydroxide, alkali metal phenolates such as sodium phenolate or alkali metal alcoholates such as sodium methylate may also be used as a catalyst. Hexahydrotriazines are also suitable catalysts.

Silaamines with carbon-silicon bonds may also be used as catalysts, such as those silaamines described in German Patent No. 1,229,290, for example, 2,2,4-trimethyl-2-silamorpholine or 1,3-diethylaminomethyl-tetramethyldisiloxane.

Other catalysts may include tertiary amines such as triethylamine, tributylamine, triethylenediamine, Nj-methylmorpholine, Nj-ethyl-morpholine, N-cocomorpholine, N,N,N',N'-tetramethylethylenediamine, 1,4-diaza-bicyclo-(2,2,2)-octane, N-methyl-N'-dimethylaminoethyl piperazine, N,N-benzylamine, bis-(N,N-diethylaminoethyl)-adipate, N,N-diethyl benzlyamine, pentamethyl diethylenetriamine, N,N-dimethyl cyclohexylamine, N,N,N',N'-tetramethyl-1,3-butanediamine, N,N-dimethyl-beta-phenyl ethylamine, 1,2-dimethyl imidazole, 2-methyl imidazole, hexahydrotriazine derivatives, triethanolamine, triisopropanolamine, N-methyl-diethanolamine, N-ethyl-diethanolamine, N,Nj-dimethyl-ethanolamine, and tertiary amine reaction products with alkylene oxides such as propylene oxide and/or ethylene oxide.

Other examples of catalysts which may be used according to the invention and details of the catalysts may be found in Kunststoff-Handbuch, Volume VII, published by Vieweg and Hochtlen, Carl-Hanser-Verlag, Munich 1966, e.g., on pages 96 to 102.

The catalyst may generally be used in a quantity of between about 0.001% and 10% by weight, based on the quantity of isocyanate, and may be added simultaneously with the other components.

Suitable polyester amides and polyamides include, for example, predominantly linear condensates obtained from, for example, polyvalent saturated and unsaturated carboxy acids or their anhydrides and polyvalent saturated and unsaturated amino alcohols, diamine, polyamines and mixtures thereof.

The monomeric, oligomeric, or polymeric carboxylic acid may be aliphatic, cycloaliphatic, aromatic and/or heterocyclic and may be substituted, for example, with halogen atoms and may be unsaturated; examples include: succinic acid, adipic acid, sebacic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, and dimethylterephthalate.

Suitable monomeric, oligomeric, or polymeric organic epoxides which may be used according to this invention may be of the ether or ester types, although the ether type epoxy resins are preferred. Examples of ester-type epoxy resins include polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g. succinic acid, glutaric acid, adipic acid, pimelic acid, suberic acid, azelaic acid, sebacic acid, or dimerized or trimerized linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Ether-type epoxy resins are obtained by reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions instead of being single simple compounds are generally complex mixtures of glycidyl polyethers. These ethers may be made from acyclic alcohols such as ethylene glycol, diethylene glycol, and higher poly(oxyethylene) glycols, propane-1,2-diol and poly(oxypropylene)glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and polyepichlorohydrins; from cycloaliphatic alcohols such as resorcinol, quinitol, bis(4-hydroxycyclohexyl)methane, and 2,2-bis(4-hydroxycyclohexyl)propane, and from alcohols having aromatic nuclei, such as N,N-bis(2-hydroxyethyl)aniline and p,p'-bis(2-hydroxyethylamino)diphenylmethane. Alternatively, they may be made from mononuclear phenols, such as resorcinol and hydroquinone, and from polynuclear phenols, such as bis(4-hydroxyphenyl)methane (otherwise known as bisphenol F), 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, (otherwise known as bisphenol A), 2,2-bis(3,5-dibromo-4-hydroxyphenyl)propane, propane, and novolacs formed from aldehydes such as formaldehyde, acetaldehyde, chloral, and furfuraldehyde, with phenol itself, and phenol substituted in the ring by chlorine atoms or by alkyl groups such as 4-chlorophenol, 2-methylphenol, and 4-tert-butylphenol.

The epoxy resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxy-aromatic)alkane with a halogen-substituted aliphatic epoxide in the presence of a base such as, for example, sodium hydroxide or potassium hydroxide.

In one preferred embodiment, the epoxy resins comprise diglycidyl ethers of bisphenols, especially bisphenol A. These may be made by reacting epichlorohydrin with bisphenol A in the presence of an alkaline catalyst. By controlling the operating conditions and varying the ratio of epichlorohydrin to bisphenol A, products of different molecular weight can be made.

Other usable epoxy resins include the diglycidyl ethers of other bisphenol compounds such as bisphenol B, F, G, and H.

Another class of epoxy resins useful in the present invention is the epoxidized novolacs, particularly the epoxy cresol and epoxy phenol novolacs. These are produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also may be utilized in the present invention. Epoxy resins having non-benzenoid molecular structures generally are referred to in the art as being aliphatic epoxy resins or cycloaliphatic epoxy resins. Cycloaliphatics may be produced by the peracetic epoxidation of cyclic olefins and by the condensation of an acid such as tetrahydrophthalic with epichlorohydrin, followed by dehydrohalogenation. The aliphatic epoxy resins may be prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin to form liquid epoxy resins characterized by viscosities which are lower than epoxy resins derived from aromatic hydroxy compounds. When cured, such aliphatic epoxy resins are not as brittle as the aromatic epoxy resins, and in many instances, exhibit elastomeric properties.

The reaction of a metal-nitrogen polymer with the above-mentioned epoxide-substituted monomers, oligomers, or polymers may proceed with or without a catalyst. Representative examples of such catalysts are Lewis Acids such as $BF_3$ and its complexes.

When such multifunctional organic monomers, oligomers, or polymers are reacted with metal-containing polymers of the type described above, crosslinked compositions containing organic "bridge" segments are believed to occur. When the total fraction of multifunctional organic monomer, oligomer, or polymer used in the reaction mixture is high, reaction products exhibiting a combination of the desirable properties characteristic of typical organic polymers as well as the desirable properties characteristic of the metal-containing polymer are obtained. For example, while polysilazanes have favorable thermal stability, they are often not very strong materials. By co-reacting a polysilazane and an organic diepoxide, however, a composition having good strength as well as good thermal stability can be obtained. Inorganic fillers which are incompatible with typical organic polymer resins have also been found to be compatible with the newly discovered hybrid resins.

While many metal-containing polymers may be suitable for such modification, the most preferred embodiment of this invention rests on the surprising behavior and properties obtained by reacting alkenyl-substituted silicon-nitrogen polymers with a large fraction of an organic monomer, oligomer, or polymer comprising a multiplicity of electrophilic substituents, and then introducing further crosslinking into the reaction product so obtained by inducing alkenyl crosslinking by supplying an energy input, or by hydrosilylation. Preferred silicon-nitrogen polymers suitable for the practice of this invention thus comprise liquid metal-nitrogen polymers having the repeat units:

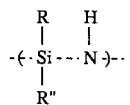

-continued

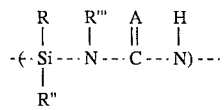

wherein R=alkenyl and R'=H (as shown) and R", R'" and A are defined as above.

Such silicon-nitrogen polymers can be, for example, a polysilazane, polyureasilazane, or poly(thio)ureasilazane, although polysilazanes and polyureasilazanes are preferred. While this listing is representative of the types of silicon-nitrogen polymers which may be used in the practice of this invention, it is not meant to be exhaustive. The silicon-nitrogen polymers suitable for the practice of this invention may include cyclic oligomers and ring-based and linear polymers. Low molecular weight, liquid silicon-nitrogen polymers are preferred, since the co-reactant organic monomers, oligomers, or polymers used in this invention are often miscible with, or soluble in liquid silicon-nitrogen polymers and the resulting mixture can be processed without the use of a solvent vehicle. Preferably, the silicon-nitrogen polymers used have a number average molecular weight ($M_n$) of less than about 2,000, more preferably less than 1,500, and most preferably less than about 1,000. Narrow molecular weight distributions ($M_w/M_n$<about 2.0) are preferred. Typically, it is preferable to include such polymers at greater than about 30 wt. % of the total composition of metal-nitrogen polymer plus organic electrophile.

Representative, low molecular weight liquid silicon-nitrogen polymers comprising silyl vinyl groups have been shown in the past to convert rapidly to rigid, solid materials through vinyl crosslinking reactions. Such crosslinking can occur rapidly (<1 minute) at modest temperature (<150° C.) using free radical generator additives. Such crosslinking is taught, for example, in U.S. Pat. No. 4,929,704 entitled "Isocyanate- and Isothiocyanate-Modified Polysilazane Ceramic Precursors" which issued in the name of Schwark on May 29, 1990; U.S. Pat. No. 5,001,090 entitled "Silicon Nitride Ceramics from Isocyanate- and Isothiocyante-Modified Polysilazanes" which issued in the name of Schwark on Mar. 19, 1991; U.S. Pat. No. 5,021,533 entitled "Crosslinkable Poly(thio)ureasilazane Composition Containing a Free Radical Generator" which issued in the name of Schwark on Jun. 4, 1991; U.S. Pat. No. 5,032,649 entitled "Organic Amide-Modified Polysilazane Ceramic Precursors" which issued in the name of Schwark on Jul. 16, 1991; and U.S. Pat. No. 5,155,181 entitled "(Thio)amide-Modified Silazane Polymer Composition Containing a Free Radical Generator" which issued in the name of Schwark on Oct. 13, 1992; U.S. Pat. No. 5,155,181 entitled "(Thio)amide-Modified Silazane Polymer Composition Containing a Free Radical Generator" which issued in the name of Schwark on Oct. 13, 1992; and U.S. Pat. No. 4,722,988 entitled "Organopolysilazane Composition Containing Free Radical Generators and Capable of Being Crosslinked by an Energy Input" which issued in the names of Porte et al. on Feb. 2, 1988. Hydrosilylation crosslinking mechanisms have also been demonstrated using added metal catalysts such as chloroplatinic acid. Such crosslinking is taught, for example, in U.S. Pat. No. 4,689,252 entitled "Polysilazane Composition which can Crosslink in the Presence of a Metal Compound Catalyzing a Hydrosilylation Reaction" which issued in the names of Lebrun et al. on Aug. 25, 1987.

Suitable free radical generators include, but are not limited to, organic and inorganic peroxides, alkali metal persulfates, ammonium persulfate, redox systems, aliphatic azo compounds, organic and inorganic peroxides with organic and inorganic metal compounds. Suitable peroxide initiators include, but are not limited to, hydrogen peroxide and acyl or aryl peroxides such as p-menthane hydroperoxide, ethyl ketone peroxide, benzoyl peroxide, tert-butyl peroxybenzoate, acetyl benzyl peroxide, p-chlorobenzoyl peroxide, alkoxy benzoyl peroxide, lauroyl peroxide, dicaproyl peroxide, crotonyl peroxide, di-tert-alkyl peroxide, di-ter-butyl diphosphate peroxide, peracetic acid, cyclohexyl hydroperoxide, and dicumyl peroxide. Suitable alkali metal persulfates include ammonium persulfate, potassium persulfate and sodium persulfate. Any suitable commonly known redox systems as known in the art may be used. Other initiator systems may be used such as peroxides with metal compounds as activators such as ethyl ketone peroxide with cobalt naphthenate, potassium persulfate with ferric sulfate or cupric sulfate and benzoyl peroxide with a tertiary amine activator such as N,N-dimethyl aniline.

The specific alkenyl-substituted compositions which are a most preferred embodiment of this invention and generally comprise the reaction product of at least one organic monomer, oligomer, or polymer comprising a multiplicity of electrophilic substituents and a silicon-nitrogen polymer comprising the repeat units:

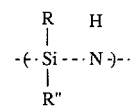

or

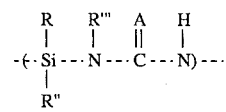

wherein R=alkenyl, R'=H (as shown), and R", R'", and A are defined as above, are thus further characterized in their ability to further crosslink through the silyl alkenyl groups by an energy input or by a hydrosilylation mechanism. More preferred are reaction products which convert from a liquid to a rigid or rubbery solid upon vinyl crosslinking. Most preferred are compositions which convert from a low viscosity liquid (<5,000 cp) to a rigid, or rubbery solid upon vinyl crosslinking. The energy input can be provided by supplying radiation in the form of ultraviolet (UV) radiation, electron beam radiation, laser or gamma radiation, or thermal energy to the composition. It is preferred that such polymers comprise at least about 30 weight percent of the total weight based on metal-nitrogen polymer and organic electrophile.

It has also been unexpectedly discovered that by selecting a multifunctional organic electrophile of the appropriate activity, the heat generated from the reaction of the organic electrophile with a silicon-nitrogen polymer comprising R=vinyl to form an uncrosslinked "hybrid" polymer may cause spontaneous crosslinking of the vinyl groups within the co-reacted composition. A very hard, rigid object can thus be obtained in a matter of several minutes merely by admixing a liquid diisocyanate, for example, and a low molecular weight, liquid, vinyl-substituted polysilazane or polyureasilazane at room temperature. Self-initiated crosslinking can be especially effective when a free radical generator such as a peroxide or an azo compound is added to the reaction mixture, so that the heat generated in the reaction of the organic electrophile with the silicon-nitrogen polymer initiates decomposition of the free radical generator to provide a high concentration of free radicals. This promotes rapid vinyl crosslinking at relatively low temperatures in a very short period of time (e.g., <5 minutes). In the absence of a large heat of reaction, radiation or thermal energy from an external source may be provided. Such thermal energy may be provided by simple convective heating or by induction, or by irradiation using a radiation source such as an electron beam.

The uncrosslinked compositions of the instant invention may be useful as curable coatings, infiltrants for porous bodies, or as low viscosity molding compositions suitable for injection molding, reaction injection molding (RIM), or pour molding of three dimensional objects, or for use in a variety of alternative forming techniques such as pulltrusion, extrusion, blow-molding, resin transfer molding, prepreging, casting, compression molding, etc. These compositions may also be used as surface modifiers for compatibilizing inorganic/organic interfaces in composite materials, or as binders for ceramic or metal powders for fabricating either ceramic monoliths or composite materials. The uncrosslinked compositions may be either unfilled or filled with either an organic or an inorganic filler. Such fillers can be particulates, platelets, or fibers in either chopped or continuous form. The uncrosslinked compositions may also be used as coatings, adhesives, or materials suitable for spinning fiber, or as matrices or infiltrants in continuous or discontinuous fiber-reinforced composites or for porous particulate or platelet preforms. Uses include, but are not limited to, weather resistant coatings, marine coatings, molded parts for automotive and sports applications, as well as aerospace applications where high thermal stability is desirable.

The entire subject matter of each of the documents cited in the "Detailed Description of the Invention" is specifically incorporated herein by reference.

We claim:

1. A reaction mixture comprising (1) at least one organic polymer comprising a multiplicity of organic, electrophilic substituents wherein said at least one organic polymer comprises at least one compound selected from the group consisting of at least one diester, at least one polyester, at least one polyamide, at least one polyacrylate, at least one polymethacrylate, at least one diepoxide, at least one multifunctional epoxide, at least one diisocyanate and at least one multi functional isocyanate, and (2) at least one of (i) a polymer selected from the group consisting of silicon-nitrogen polymers, aluminum-nitrogen polymers, and boron-nitrogen polymers comprising the repeat units (a), (b), and (c),

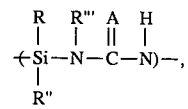 (a)

 (b)

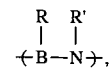 (c)

and

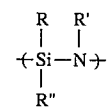 (d)

respectively, where R, R', R" and R'"=hydrogen, alkyl, alkenyl, alkynyl or aryl and A=O or S; (ii) mixtures of polymers comprising two or more of the structural units (a), (b), (c), and (d); (iii) metal-crosslinked polymers comprising one or more of the structural units (a), (b), (c), and (d); and (iv) block copolymers comprising two or more of the structural units (a), (b), (c), and (d).

2. The reaction mixture of claim 1, further comprising at least one organic monomer or oligomer comprising a multiplicity of organic electrophilic substituents comprising at least one compound selected from the group consisting of at least one diester, at least one diepoxide, at least one multifunctional epoxide, at least one diisocyanate, and at least one multifunctional isocyanate.

3. The reaction mixture of claim 1, wherein component (2) comprises a metal-nitrogen polymer comprising the repeat unit

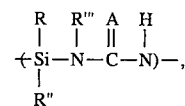

wherein R=alkenyl.

4. The reaction mixture of claim 3, wherein component (2) further comprises the repeat unit

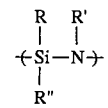

wherein R=alkenyl.

5. The reaction mixture of claim 1, wherein at least one of component (1) and component (2) is a liquid.

6. The reaction mixture of claim 1, further comprising at least one filler.

7. The reaction mixture of claim 6, wherein said at least one filler comprises a material selected from particulates, platelets, and fibers.

8. The reaction mixture of claim 1, further comprising at least one free radical generator.

9. The reaction mixture of claim 8, wherein said at least one free radical generator comprises a compound selected from azo compounds and peroxides.

10. An uncrosslinked reaction product comprising the reaction product of (1) at least one organic polymer comprising a multiplicity of organic, electrophilic substituents wherein said at least one organic polymer comprises at least one compound selected from the group consisting of at least one diester, at least one polyester, at least one polyamide, at least one polyacrylate, at least one polymethacrylate, at least one diepoxide, at least one multifunctional epoxide, at least one diisocyanate and at least one multifunctional isocyanate, and (2) at least one of (i) a polymer selected from the group consisting of silicon-nitrogen polymers, aluminum-nitrogen polymers, and boron-nitrogen polymers comprising the repeat units (a), (b), and (c),

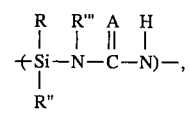 (a)

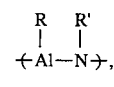 (b)

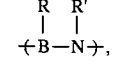 (c)

-continued and

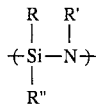

respectively, where R, R', R" and R'"=hydrogen, alkyl, alkenyl, alkynyl or aryl and A=O or S; (ii) mixtures of polymers comprising two or more of the structural units (n), (b), (c), and (d); (iii) metal-crosslinked polymers comprising one or more of the structural units (a), (b), (c), and (d); and (iv) block copolymers comprising two or more of the structural units (a), (b), (c), and (d).

11. The uncrosslinked reaction product of claim 10, further comprising at least one organic monomer or oligomer comprising a multiplicity of organic electrophilic substituents comprising at least one compound selected from the group consisting of at least one diester, at least one diepoxide, at least one multifunctional epoxide, at least one diisocyanate, and at least one multifunctional isocyanate.

12. The uncrosslinked reaction product of claim 10, wherein component (2) comprises a metal-nitrogen polymer comprising the repeat unit

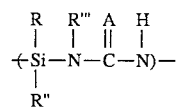

wherein R=alkenyl.

13. The uncrosslinked reaction product of claim 10, wherein component (2) further comprises the repeat unit

wherein R=alkenyl.

14. The uncrosslinked reaction product of claim 10, wherein the uncrosslinked reaction product comprises a liquid.

15. The uncrosslinked reaction product of claim 10, further comprising at least one filler.

16. The uncrosslinked reaction product of claim 15, wherein said at least one filler comprises a material selected from particulates, platelets, and fibers.

17. The uncrosslinked reaction product of claim 10, further comprising at least one free radical generator.

18. The uncrosslinked reaction product of claim 17, wherein said at least one free radical generator comprises a compound selected from azo compounds and peroxides.

19. A crosslinked reaction product comprising the reaction product of (1) at least one organic polymer comprising a multiplicity of organic, electrophilic substituents wherein said at least one organic polymer comprises at least one compound selected from the group consisting of at least one diester, at least one polyester, at least one polyamide, at least one polyacrylate, at least one polymethacrylate, at least one diepoxide, at least one multifunctional epoxide, at least one diisocyanate and at least one multifunctional isocyanate, and (2) at least one of (i) a polymer selected from the group consisting of silicon-nitrogen polymers, aluminum-nitrogen polymers, and boron-nitrogen polymers comprising the repeat units (a), (b), and (c),

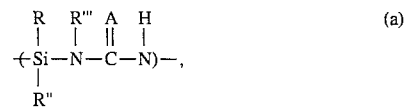

and

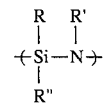

respectively, where R, R', R" and R'"=hydrogen, alkyl, alkenyl, alkynyl or aryl and A=O or S; (ii) mixtures of polymers comprising two or more of the structural units (s), (b), (c), and (d); (iii) metal-crosslinked polymers comprising one or more of the structural units (a), (b), (e), and (d); and (iv) block copolymers comprising two or more of the structural units (a), (b), (c), and (d).

20. The crosslinked reaction product of claim 19, further comprising at least one organic monomer or oligomer comprising a multiplicity of organic electrophilic substituents comprising at least one compound selected from the group consisting of at least one diester, at least one diepoxide, at least one multifunctional epoxide, at least one diisocyanate, and at least one multifunctional isocyanate.

21. The crosslinked reaction product of claim 19, wherein component (2) comprises a metal-nitrogen polymer comprising the repeat unit $$\begin{array}{cccc} & R & R''' & A & H \\ & | & | & || & | \\ +Si- & N-C-N\!\!\rightarrow \\ & | \\ & R'' \end{array}$$

wherein R=alkenyl.

22. The crosslinked reaction product of claim 19, wherein component (2) further comprises the repeat unit $$\begin{array}{cc} R & R' \\ | & | \\ +Si-N\!\!\rightarrow \\ | \\ R'' \end{array}$$

wherein R=alkenyl.

23. The crosslinked reaction product of claim 19, wherein at least one of component (1) and component (2) comprises a liquid.

24. The crosslinked reaction product of claim 19, wherein said crosslinking is provided through at least one mechanism selected from thermal, radiation, radical, and ionic-based crosslinking mechanisms.

25. The crosslinked reaction product of claim 19, further comprising at least one filler.

26. The crosslinked reaction product of claim 19, wherein said at least one filler comprises a material selected from particulates, platelets, and fibers.

27. The crosslinked reaction product of claim 19, further comprising at least one free radical generator.

28. The crosslinked reaction product of claim 27, wherein said at least one free radical generator comprises a compound selected from azo compounds and peroxides.

* * * * *